United States Patent Office 2,850,482
Patented Sept. 2, 1958

2,850,482
ALLYLARYLOXYACETAMIDES AND POLYMERS THEREFROM

Gaetano F. D'Alelio, Pittsburgh, Pa., assignor to Koppers Company, Inc., a corporation of Delaware No Drawing. Application October 20, 1954
Serial No. 463,617

24 Claims. (Cl. 260—47)

This application is concerned with certain new allylaryloxyacetamides. It is concerned with these substances in their monomeric as well as polymeric form.

Further, the invention is concerned with insoluble or "cured" polymers which can be obtained by aftertreating polymeric allylaryloxyacetamides to cause cross-linking.

This invention is particularly concerned with allylaryloxyacetamides of the formula

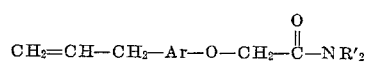

in which Ar is an arylene radical and R' is chosen from the class consisting of hydrogen, alkyl, aryl, aralkyl, alkaryl and in which R' can be linked with nitrogen to form a heterocyclic group of the formula

which represents a heterocyclic ring having less than 7 carbon atoms such as for example the groups pyridyl, pyrimidyl, amino-1,2,4-triazolyl, piperidyl, piperazino, and morpholino. In the foregoing formula R' when alkyl can be represented by such radicals as for example, methyl, ethyl, propyl, n-butyl, sec-butyl, amyl, hexyl, decyl and the like; when R' is aryl it can be illustrated by such radicals as, for example, phenyl, naphthyl, chlorophenyl and the like; when R' is aralkyl it can be, for example, such radicals as benzyl, 3-phenylpropyl; and when alkaryl, such radicals as, for example, tolyl, xylyl, ethylphenyl and the like.

In particular the invention is concerned with allylphenoxyacetamides. The polymers of this invention are useful in many polymer applications such as, for example, for post-reaction with cross-linking agents such as polyisocyanates, polyoxiranes, and formaldehyde in those instances in which at least one R' is hydrogen.

As used herein the term "polymer" embraces both homopolymers and copolymers. The term "copolymer" as used herein embraces polymeric materials derived from the polymerization of two or more monomeric materials. That is, 2,3,4,5 . . . ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following perferred embodiments:

Example I

One hundred parts 4-allylphenoxyacetic acid is dissolved in 1000 parts of toluene in a vessel equipped with a Dean-Stark type trap and with means for introduction of a gas below the surface of the toluene solution. Ammonia is bubbled into and through the solution while it is heated to and maintained at reflux temperature. The refluxing and addition of ammonia is continued until the theoretical quantity of water is collected, that is approximately 10 parts water.

Nine hundred parts of toluene are removed by vacuum distillation and the residuum cooled. The desired product, 4-allylphenoxyacetamide is separated by filtration. The compound is characterized by analyses for carbon, hydrogen and nitrogen and by hydrogen absorption, the results of which are in substantial agreement with the theoretical values.

Example II

The procedure of Example I is repeated substituting for the 4-allylphenoxyacetic acid there used a similar quantity of 3-allylphenoxyacetic acid. There is obtained 3-allylphenoxyacetamide, which is characterized by analyses for carbon, hydrogen and nitrogen and by hydrogen absorption, the results of which are in substantial agreement with the theoretical values.

It will be realized that in Examples I and II for the 4-allylphenoxyacetic acid and 3-allylphenoxyacetic acid there used, there can be substituted equimolar quantities of allylaryloxyacetic acids illustrated by such compounds as, for example, 3-allylphenoxyacetic acid and allyl-1- and -2-naphthols and the like.

Additionally, amines of the formula $HNR'_2$ in which R' has the meaning heretofore described can be utilized in place of ammonia. In those instances in which the amines are liquid or solid an equimolar quantity of amine based on the acid is utilized and refluxing is continued until the theoretical amount of water is evolved.

Illustrative of the amines which can be utilized are such compounds as methylamine, ethylamine, propylamine, butylamine, decylamine, dimethylamine, dipropylamine, dibutylamine, didecylamine, aniline, methylaniline, propylaniline, benzylamine, dibenzylamine, dimethylaminoanilines, the aminopyridines, the aminopyrimidines, guanazole and the like. There are obtained the various allylaryloxyacetamides of this invention. These monomeric compounds of this invention are characterized by carbon, hydrogen and nitrogen analyses and by hydrogen absorption which give results which are in substantial agreement with the theoretical values.

Example III

Ten parts 4-allylphenoxyacetamide (obtained as in Example I) are dissolved in 90 parts xylene and there is added 0.75 percent benzoyl peroxide based on the acetamide. The mixture is cooled to the temperature of a Dry Ice bath and atmosphere alternately evacuated and filled with nitrogen. Polymerization is carried out under an atmosphere of nitrogen at approximately 100° C. for one day. The xylene is removed by vacuum distillation. There is obtained homopolymeric 4-allylphenoxyacetamide.

Example IV

Example III is repeated substituting for the 4-allylphenoxyacetamide there used a similar quantity of 3-allylphenoxyacetamide (obtained as in Example II). There is obtained homopolymeric 3-allylphenoxyacetamide.

Similarly, the various homopolymers of this invention are obtained following the procedure set forth in Example III and substituting for the 4-allylphenoxyacetamide there used similar quantities of various allylaryloxy acetamides of this invention as illustrated by the structural formula

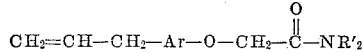

in which R' and Ar have the meanings heretofore described. Further, the homopolymers of this invention can be prepared as illustrated in Example V by amidation of homopolymeric allylaryloxyacetic acids, the prepara-

Example V

Two hundred parts of homopolymeric 4-allylphenoxyacetic acid obtained as described in Example I of my copending application filed concurrently herewith are dissolved in 2000 parts toluene and treated with 140 parts thionyl chloride at reflux temperature to produce the acid chloride form of polymer. The unreacted thionyl chloride is removed by distillation in a vacuum.

The residue is maintained at reflux and ammonia is introduced beneath the surface of the toluene until absorption of ammonia ceases. The toluene is removed by vacuum distillation and there is obtained homopolymeric 4-allylphenoxyacetamide.

It will be realized that in the foregoing example there can be substituted for the homopolymeric 4-allylphenoxyacetic acid similar quantities of homopolymeric allylaryloxyacetic acids such as, for example, homopolymeric 3-allylphenoxyacetic acid, obtained as described in my above-referred to copending application. Similarly, for the ammonia utilized in this example there can be substituted various amines of the general formula $HNR'_2$ in which R' has the meaning heretofore described.

Example VI

Ten parts 4-allylphenoxyacetamide (obtained as described in Example I), 90 parts styrene and 0.75 part benzoyl peroxide are placed in a suitable reaction vessel and the atmosphere is swept out and filled with nitrogen. Polymerization is then carried out under an atmosphere of nitrogen at approximately 90° C. for 21 hours. There is obtained a linear, soluble copolymer.

Example VII

Example VI is repeated substituting for the styrene there used a similar quantity of butadiene. There is obtained a copolymer soluble in toluene.

Example VIII

Example VI is repeated substituting for the styrene there used a similar quantity of acrylonitrile. There is obtained a polymer soluble in dimethylformamide.

It is to be noted that this copolymer can be cold drawn to produce molecularly oriented shaped articles such as, for example, fibers. It is further to be noted that these copolymers possess dye-receptivity as compared to acrylonitrile polymers. That is, when polymeric acrylonitrile and the subject copolymer are subjected to the same dye treatment, the latter is deeply dyed, whereas the former is dyed only slightly.

Example IX

Example VI is repeated substituting for the styrene therein used a similar quantity of maleic anhydride. There is obtained a polymer soluble in toluene.

Example X

Example VI is repeated substituting for the styrene there used a similiar quantity of methyl methacrylate. There is obtained a polymer soluble in toluene.

Example XI

Example VI is repeated substituting for the 4-allylphenoxyacetamide there used a similar quantity of 3-allylphenoxyacetamide (obtained as in Example II). There is obtained a linear, soluble copolymer. Similarly, the various allylaryloxyacetamides of this invention can be utilized in place of 3-allylphenoxyacetamide used herein. Additionally, it will be realized that the various other ethylenically unsaturated monomers utilized in the examples VI through X inclusive can be utilized herein in combination with the allylaryloxyacetamides to yield copolymers. Further, there can be utilized mixtures of two or more allylaryloxyacetamides in the preparation of copolymers either alone or in combination with a copolymerizable ethylenically unsaturated monomer or mixtures of two or more copolymerizable ethylenically unsaturated monomers.

It is to be noted that for benzoyl peroxide utilized in the foregoing examples there can be substituted a variety of peroxy-catalysts such as hydrogen, acetyl, acetylbenzoyl, phthalyl and lauroyl peroxides, tertiary-butyl hydroperoxides, etc., and other per compounds, for example ammonium persulfate, sodium persulfate, sodium perchlorate and the like.

Example XII

One hundred parts of the polymer of Example III is admixed with 10 parts of diglycidyl ether of bisphenol and 1 percent of ethylene diamine and the mixture warmed gently. There is obtained a thermoset resin.

Example XIII

Example XII is repeated utilizing in place of diglycidyl ether of bisphenol and equal weight of the resin described at column 7 of my U. S. Patent 2,658,885, granted Nov. 10, 1953. There is obtained a thermoset resin.

It will be realized that the various epoxyalkoxy hydrocarbon substituted phenol aldehyde resins dscribed in that patent can be utilized in the foregoing procedure. Additionally the epoxyalkoxy chloro-substituted phenol aldehyde resins described in my U. S. Patent 2,658,884, granted Nov. 10, 1953, can be utilized in the foregoing procedure.

It will be understood that in place of the ethylenediamine catalyst utilized in Examples XII and XIII there can be substituted equivalent portions of such amine catalysts as tetrahydroquinoline and piperidine to obtain substantially similar results.

There can be substituted for the polymer utilized in Examples XII and XIII similar quantities of the various polymers of this invention, that is, polymers of allylaryloxyacetamides.

Example XIV

One hundred parts of the copolymer of Example VI is admixed with approximately 10 parts 2,4-toluenediisocyanate and the mixture warmed. There is obtained a thermoset resin.

In place of the 2,4-toluenediisocyanate utlized above there can be substituted other diisocyanates such as phenylenediisocyanate; 2,6-toluenediisocyanate; 1,5-naphthalenediisocyanate; 1 - chloro - 1 - phenylene - 2,4 - diisocyanate; 4,4'-xenylenediisocyanate; tetramethylenediisocyanate and the like. The amount of these diisocyanates utilized is governed by the degree of cross-linking desired.

Example XV

One hundred parts of the polymer of Example III are intimately admixed with approximately 15 parts hexamethylenetetramine and the mixture cured in a mold according to conventional techniques. A thermoset resin results.

Example XVI

One hundred parts of the polymer of Example III are intimately admixed with approximately 10 parts hexamethylenetetramine and 5 parts urea and the mixture cured in a mold according to conventional techniques. A thermoset resin results.

It will be realized that such aldehyde reactive nitrogen-containing substances as, for example, melamine, can be substituted in the foregoing for the urea to obtain substantially similar results.

As used herein the term "aryl" embraces a variety of atomatic nuclei such as phenyl, naphthyl, and the lower alkyl and halogen substituted nuclei, that is the aryl nuclei containing one or more methyl, ethyl, propyl, butyl, chloro- or bromo-substituents.

While the invention has been described with reference to particular embodiments thereof, it will be understood that in its broadest aspects the invention may be variously em-

What is claimed is:

1. An allylaryloxyacetamide of the formula $$CH_2=CH-CH_2-Ar-O-CH_2-\overset{O}{\underset{\|}{C}}-NR'_2$$

in which Ar is an arylene radical, and R' is chosen from the class consisting of hydrogen, alkyl, aryl, aralkyl and alkaryl and in which R' can be linked with nitrogen to form a heterocyclic group of the formula

which represents a heterocyclic ring having less than 7 carbon atoms.

2. 4-allylphenoxyacetamide.
3. 3-allylphenoxyacetamide.
4. 2-allylphenoxyacetamide.
5. A homopolymer of an allylaryloxyacetamide of claim 1.
6. A polymer of an allylaryloxyacetamide having a plurality of repeating units of the formula $$\begin{array}{c}-CH_2-CH-\\|\\CH_2\\|\\Ar-O-CH_2-\overset{O}{\underset{\|}{C}}-NR'_2\end{array}$$

in which Ar is an arylene radical, and R' is chosen from the class consisting of hydrogen, alkyl, aryl, aralkyl and alkaryl and in which R' can be linked with nitrogen to form a heterocyclic group of the formula

which represents a heterocyclic ring having less than 7 carbon atoms.

7. A copolymer of an allylaryloxyacetamide of claim 1 and at least one other copolymerizable ethylenically unsaturated monomer.
8. A copolymer of 4-allylphenoxyacetamide and at least one other copolymerizable ethylenically unsaturated monomer.
9. A copolymer of claim 7 in which the unsaturated monomer is styrene.
10. A copolymer of claim 7 in which the unsaturated monomer is acrylonitrile.
11. A copolymer of claim 7 in which the unsaturated monomer is butadiene.
12. A copolymer of claim 7 in which the unsaturated monomer is maleic anhydride.
13. A copolymer of claim 7 in which the unsaturated monomer is methyl methacrylate.
14. An insoluble polymer of a polymerizable mass comprising an allylaryloxyacetamide of claim 2 and at least one other polymerizable ethylenically unsaturated monomer, said polymer being cross-linked by a plurality of linkages derived from said amide group.
15. An insoluble polymer of a polymerizable mass comprising 4-allylphenoxyacetamide and at least one other polymerizable ethylenically unsaturated monomer, said polymer being cross-linked by a plurality of linkages derived from said amide group.
16. A polymer of claim 14 in which the unsaturated monomer is styrene.
17. A polymer of claim 14 in which the unsaturated monomer is acrylonitrile.
18. A polymer of claim 14 in which the unsaturated monomer is butadiene.
19. A polymer of claim 14 in which the unsaturated monomer is maleic anhydride.
20. A polymer of claim 14 in which the unsaturated monomer is methyl methacrylate.
21. A copolymer of 3-allylarylphenoxyacetamide and at least one other copolymerizable ethylenically unsaturated monomer.
22. A copolymer of 2-allylarylphenoxyacetamide and at least one other copolymerizable ethylenically unsaturated monomer.
23. An insoluble polymer of a polymerizable mass comprising 3-allylarylphenoxyacetamide and at least one other polymerizable ethylenically unsaturated monomer, said polymer being cross-linked by a plurality of linkages derived from said amide group.
24. An insoluble polymer of a polymerizable mass comprising 2-allylarylphenoxyacetamide and at least one other polymerizable ethylenically unsaturated monomer, said polymer being cross-linked by a plurality of linkages derived from said amide group.

References Cited in the file of this patent

UNITED STATES PATENTS

| 543,579 | Lederer | July 30, 1895 |
|---|---|---|
| 2,343,547 | Gordon | Mar. 7, 1947 |

FOREIGN PATENTS

| 65,393 | Germany | Oct. 27, 1892 |
|---|---|---|

OTHER REFERENCES

Schriner and Fuson: "Systematic Identification of Organic Compounds," 2nd edition (1935), p. 130.

Newman et al.: Jour. Amer. Chem. Soc., vol. 69, 1947, pp. 718, 720, 722, and 723.